(12) United States Patent
Tiew et al.

(10) Patent No.: US 7,391,195 B2
(45) Date of Patent: Jun. 24, 2008

(54) SELF-OSCILLATING BOOST DC-DC CONVERTERS WITH CURRENT FEEDBACK AND DIGITAL CONTROL ALGORITHM

(75) Inventors: Kee-Chee Tiew, Richardson, TX (US); Jingwei Xu, Shanghai (CN); Suribhotla Rajasekhar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 241 days.

(21) Appl. No.: 11/131,873

(22) Filed: May 18, 2005

(65) Prior Publication Data

US 2006/0261786 A1    Nov. 23, 2006

(51) Int. Cl.
*G05F 1/40* (2006.01)
*G05F 1/56* (2006.01)
*G05F 1/10* (2006.01)

(52) U.S. Cl. .................. 323/283; 323/222; 323/282; 323/285

(58) Field of Classification Search ......... 323/282–286, 323/222, 223, 225, 268, 270, 271, 273–275; 363/18, 19
See application file for complete search history.

(56) References Cited

U.S. PATENT DOCUMENTS

| | | | | |
|---|---|---|---|---|
| 6,166,527 | A * | 12/2000 | Dwelley et al. | 323/222 |
| 7,102,341 | B1 * | 9/2006 | Choudhury | 323/285 |
| 7,148,669 | B2 * | 12/2006 | Maksimovic et al. | 323/283 |
| 7,190,150 | B2 * | 3/2007 | Chen et al. | 323/222 |

* cited by examiner

*Primary Examiner*—Matthew V. Nguyen
(74) *Attorney, Agent, or Firm*—William B. Kempler; W. James Brady, III; Frederick J. Telecky, Jr.

(57) ABSTRACT

In a method and system for controlling a direct current to direct current (DC-DC) converter includes an inductor coupled to receive a voltage input at an input terminal. A diode is coupled in series between the inductor and an output terminal of the DC-DC converter. A switch is coupled between the inductor and a ground reference. The switch receives a control signal from a controller for adjusting a duty cycle of the DC-DC converter. The duty cycle controls an output voltage at the output terminal. The controller generates the control signal in response to receiving a feedback signal, which is derived as a predefined function of a voltage feedback signal indicative of the output voltage and a current feedback signal indicative of a current flowing through the inductor.

17 Claims, 4 Drawing Sheets

SELF-OSCILLATING BOOST DC-DC CONVERTERS WITH CURRENT FEEDBACK AND DIGITAL CONTROL ALGORITHM

BACKGROUND

The present disclosure relates generally to the field of power supplies, and more particularly to techniques for efficiently controlling a direct current to direct current (DC-DC) converter used in power supplies.

Switching DC-DC converters (also referred to as regulators) have been used to provide direct current (DC) power to electrical/electronic devices such as integrated circuits (ICs), digital signal processors, radio frequency (RF) circuit devices, printed circuit boards, and the like, due to their improved power conversion efficiency compared to non-switching regulators. Switching DC-DC converters regulate an average DC output voltage by selectively storing energy in an inductor during a charge cycle, e.g., during an on time of a switching element. The energy stored in the inductor is selectively transferred to charge an output capacitor in discrete packets during a discharge cycle, e.g., during an off time of the switching element. Thus, the charge and discharge cycles are controlled by the switching element such as a MOSFET by adjusting the on time and off time of a current flowing through the inductor. By comparing the voltage across the output capacitor to a reference voltage the inductor current is controlled to provide a desired output voltage.

Maintaining the desired output voltage while accommodating variations in the load and/or the input voltage may be difficult with many traditional DC-DC converters. For example, selecting a long on time with a short off time may favor a full load condition but may impair light load performance. While selecting a short on time with a long off time may improve light load performance but may impair performance at full load. In addition, a selection of the on time or the off time that may be too short may increase the converter's vulnerability to noise. Similarly, accommodating variations in input voltage with or without variations in the load may further degrade performance.

Therefore, a need exists to provide an improved method and system for efficiently controlling a DC-DC converter. Additionally, a need exists for a technique to determine the on and off time of self-oscillating boost converters for an improved performance against variations in the load and the input voltage, and for improved susceptibility to noise. Accordingly, it would be desirable to provide an improved DC-DC converter, absent the disadvantages found in the prior methods discussed above.

SUMMARY

The foregoing need is addressed by the teachings of the present disclosure, which relates to self-oscillating boost DC-DC converters having current feedback and a digital control algorithm. According to one embodiment, in a method and system for controlling a DC-DC converter includes an inductor coupled to receive a voltage input at an input terminal. A diode is coupled in series between the inductor and an output terminal of the DC-DC converter. A switch is coupled between the inductor and a ground reference. The switch receives a control signal from a controller for adjusting a duty cycle of the DC-DC converter. The duty cycle controls an output voltage at the output terminal. The controller generates the control signal in response to receiving a feedback signal, which is derived as a predefined function of a voltage feedback signal indicative of the output voltage and a current feedback signal indicative of a current flowing through the inductor.

In a particular embodiment, a method of controlling a DC-DC converter includes receiving a current feedback signal indicative of a current flowing through an inductor of the DC-DC converter and receiving a voltage feedback signal indicative of an output voltage of the DC-DC converter. The current feedback and the voltage feedback signals are compared to provide a feedback signal to a controller. A duty cycle of the DC-DC converter, and hence the output voltage, is controlled by the controller responsive to the feedback signal.

Several advantages are achieved by the method and system according to the illustrative embodiments presented herein. The embodiments advantageously provide for an improved self-oscillating DC-DC power conversion technique to adapt to changing load and input voltage conditions in a cost effective manner. The digital control algorithm advantageously deploys constraint-based control to make the converter more robust to accommodate the changing load and input voltage. In addition, digital control algorithm filters out coupling noise from the feedback signal to improve power conversion performance. Thus, the improved power conversion technique advantageously regulates the output voltage in both continuous current mode (CCM) and discontinuous control mode (DCM).

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Many traditional switching DC-DC converters may have difficulty in maintaining a desired output voltage while accommodating variations in the load and/or the input voltage. In addition, a selection of the on time or the off time that may be too short may increase the converter's vulnerability to noise. This problem may be addressed by an improved self-oscillating DC-DC converter. In the improved system and method, a current feedback signal indicative of the inductor current and an output voltage feedback signal is provided to a controller for adjusting the on and off times. A digital control algorithm is added to the controller to make the DC-DC converter more robust to accommodate changes in load, accommodate variations in the input voltage, and improve immunity to noise.

According to one embodiment, in a method and system for controlling a DC-DC converter includes an inductor coupled to receive a voltage input at an input terminal. A diode is coupled in series between the inductor and an output terminal of the DC-DC converter. A switch is coupled between the inductor and a ground reference. The switch receives a control signal from a controller for adjusting a duty cycle of the DC-DC converter. The duty cycle controls an output voltage at the output terminal. The controller generates the control signal in response to receiving a feedback signal, which is derived as a predefined function of a voltage feedback signal indicative of the output voltage and a current feedback signal indicative of a current flowing through the inductor.

Figure 1:
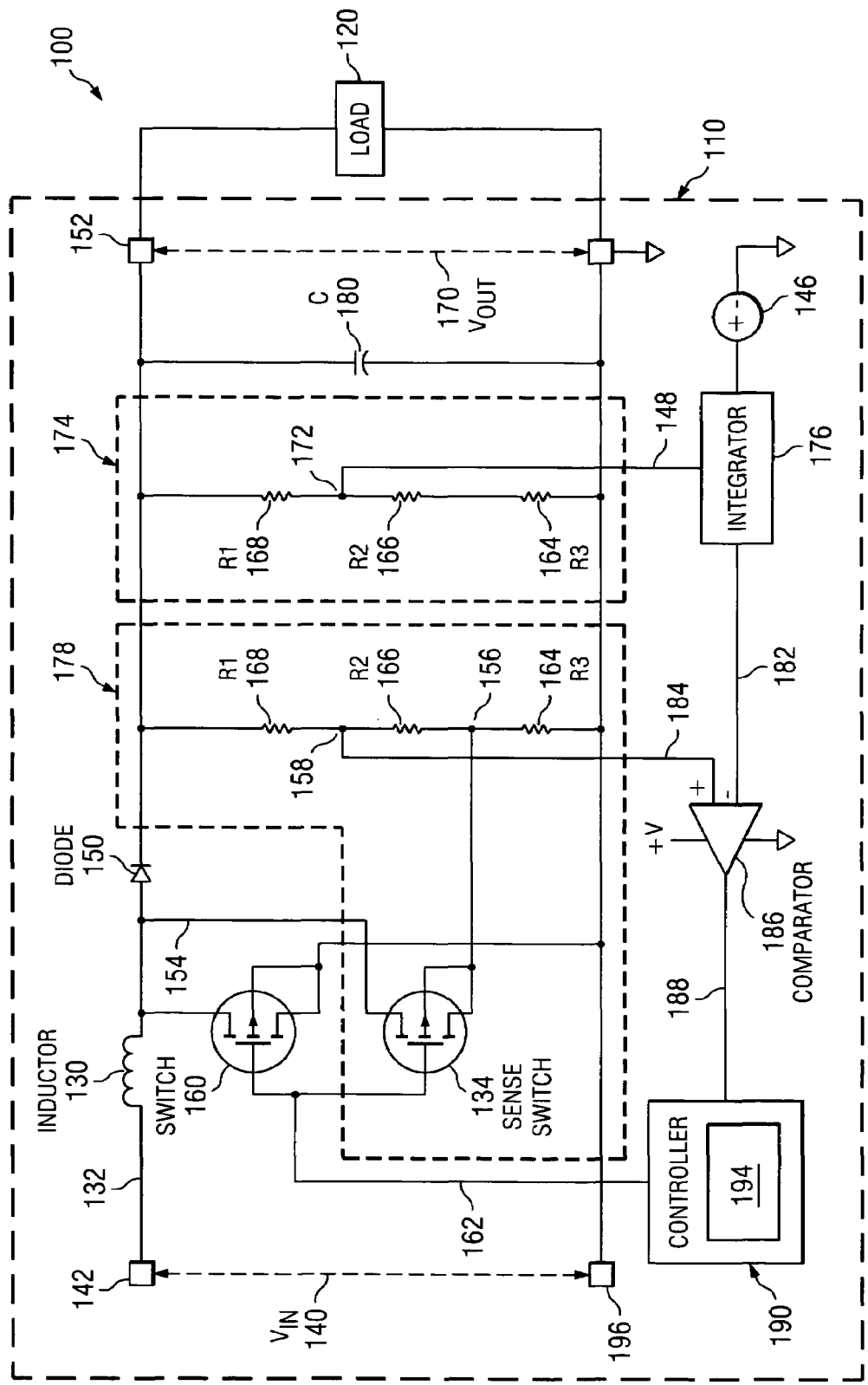
FIG. 1 depicts an electronic system including a direct current to direct current (DC-DC) converter for providing power to a load, according an embodiment.

FIG. 1 depicts an electronic system, generally designated 100, that includes a direct current to direct current (DC-DC) converter 110 providing power to a load 120, according to an embodiment. An inductor 130 is coupled to receive a voltage input 140 at an input terminal 142. In a particular embodiment, the voltage input 140 is a DC voltage applied across the input terminal 142 and a reference 196 such as ground. A diode 150 is coupled in series between the inductor 130 and an output terminal 152. A switch 160, which is the switching element in the DC-DC converter 110, is coupled between the inductor 130 and the reference 196. In a particular embodiment, the switch 160 is a MOSFET device. A capacitor 180 is connected between the output terminal 152 and the reference 196 to store the energy received from the inductor 130. In depicted embodiment, an output voltage $V_{out}$ 170 is provided to the load 120 that is coupled between the output terminal 152 and the reference 196. In a particular embodiment, the load may vary with the application. Examples of the load may include ICs, digital signal processors (DSPs), radio frequency (RF) circuit devices, printed circuit boards, and the like. The DC-DC converter 110 has a self-oscillating feature since the DC-DC converter 110 is independent of an internal and/or external generated periodic input such as a clock.

A control signal 162 is used to control, e.g., open or close, the switch 160. During a charge cycle, the switch 160 is closed (or on state) thereby providing a charge path between the input terminal 142 and the reference 196. That is, during on time $t_{ON}$ of the switch 160, an inductor current 132 flows through the inductor 130 and the switch 160. During a discharge cycle, the switch 160 is opened (or off state) thereby disconnecting the charge path between the input terminal 142 and the reference 196. Since the inductor current 132 may not change instantaneously, the inductor current 132 charges the capacitor 180 during the discharge cycle, e.g., during an off time $t_{OFF}$ of the switch 160. Additional detail of the charge and discharge cycle is described in FIG. 3.

The diode 150 is used as a rectifier to allow the inductor current 132 to flow from an input energy storage element, e.g., the inductor 130, to the output charge storage element, e.g., the capacitor 180, during the discharge cycle when the switch 160 is open. However, the diode 150 is reverse-biased during the charge cycle when the switch 160 is closed.

The time duration of the on or off state of the switch 160 controls a duty cycle of the self-oscillating DC-DC converter 110. The duty cycle is generally defined as $t_{ON}/(t_{ON}+t_{OFF})$. Thus, adjusting the duty cycle controls an average power output provided to the load 120 by adjusting the output voltage $V_{out}$ 170 in response to the changes in the load 120.

The controller 190 controls the operation (e.g., on or off control) of the switch 160 by asserting (or high) or deasserting (or low) the control signal 162 in response to receiving a feedback signal 188. In the depicted embodiment, the controller 190 includes a digital control algorithm 194 for generating the control signal 162 in response to the feedback signal 188. Additional details of the digital control algorithm 194 are described in FIG. 2. In a particular embodiment, the feedback signal 188 is derived as a predefined function of two inputs. In the depicted embodiment, the predefined function is a comparator 186. The comparator 186 receives at the positive input a current feedback signal 184 indicative of the inductor current 132 and a voltage feedback signal 182 is received at the negative input indicative of the output voltage $V_{out}$ 170. The comparator 186 asserts the feedback signal 188 when the current feedback signal 184 is greater than the voltage feedback signal 182. The comparator 186 deasserts the feedback signal 188 when the current feedback signal 184 is not greater than the voltage feedback signal 182. In a particular embodiment, the comparator 186 may be included in the controller 190.

The current feedback signal 184 is provided by a current feedback circuit 178 connected in parallel with the load 120, e.g., coupled between the output terminal 152 and the reference 196. In a particular embodiment, the current feedback circuit 178 includes resistors R1 168, R2 166 and R3 164 connected in series between the output terminal 152 and the reference 196. Junction of R1 168 and R2 166 form a node N1 158 and junction of R2 166 and R3 164 form a node N2 156. A portion $I_{inj}$ 154 of the inductor current 132 is injected into the current feedback circuit 178 at node N2 156 via a sense switch 134. The sense switch 134 is connected in parallel with the switch 160 and both the sense switch 134 and the switch 160 are controlled by the control signal 162. In a particular embodiment, the sense switch 134 is a MOSFET device.

In a particular embodiment, the values of R1 168, R2 166 and R3 164 selected may depend on application factors such as on-resistance of the switches 160 and 134. The range of values for R1 168 and R2 166 may be hundreds of kilo ohms and the range of values for R3 164 may be 50 ohms to a few hundred ohms.

During the charge cycle, the inductor current 132 will be divided between the two parallel paths, e.g., first via the switch 160 to the reference 196 and second via sense switch 134, N2 156 and R3 164 to the reference 196. Ratio of the current flowing through each path is inversely proportional to the path resistance. Thus, injected current $I_{inj}$ 154 is calculated as a percent of the inductor current 132 and is therefore indicative of the inductor current 132. Voltage $V_{N2}$ at node N2 156 is indicative of the DC voltage offset introduced by the injected current $I_{inj}$ 154 and is calculated by Equation 100.

$$V_{N2}=I_{inj}*R3 \qquad \text{Equation 100}$$

Voltage $V_{N1}$ at node N1 158 is proportional to the output voltage $V_{out}$ 170 and is biased by the DC voltage offset calculated by Equation 100. Thus, Equation 110 calculates voltage VN1 as follows:

$$V_{N1}=V_{out}*((R2+R3)/(R1+R2+R3))+(I_{inj}*R3) \qquad \text{Equation 110}$$

Voltage $V_{N1}$ at node N1 158, which is calculated by adding a first component and a second component of Equation 110, is provided as the current feedback signal 184 indicative of the inductor current 132.

An integrator 176 provides the voltage feedback signal 182. The integrator is connected in cascade with a voltage feedback circuit 174. The voltage feedback circuit 174 is connected in parallel with the load 120 and is similar to the current feedback circuit 178, e.g., coupled between the output terminal 152 and the reference 196. In a particular embodiment, the voltage feedback circuit 174 includes the resistors R1 168, R2 166 and R3 164 connected in series between the output terminal 152 and the reference 196. Within the voltage feedback circuit 174, junction of R1 168 and R2 166 form a node N3 172. Voltage $V_{N3}$ at node N3 172 is proportional to the output voltage $V_{out}$ 170 and is calculated by Equation 120 as follows:

$$V_{N3} = V_{out} * ((R2+R3)/(R1+R2+R3)) \qquad \text{Equation 120}$$

Thus, voltage $V_{N3}$ at node N3 158 is provided as a second voltage feedback signal 148 to the integrator 176, the second voltage feedback signal 148 being indicative of the output voltage $V_{out}$ 170.

The integrator 176 compensates for the DC voltage offset $V_{N2}$ introduced by the injection of current $I_{inj}$ 154 calculated in Equation 110 by integrating a difference between the second voltage feedback signal 148 and an output voltage reference $V_{ref}$ 146 over a predefined time period T to generate the voltage feedback signal 182. In a particular embodiment, the voltage feedback signal $V_{FB182}$ 182 is calculated by Equation 130 as follows:

$$V_{FB182} = \int_0^T k*(V_{N3} - V_{ref})*dt + I_c \qquad \text{Equation 130}$$

where k and $I_c$ are constants. In a particular embodiment, the comparator 186 and the integrator 176 may be included in the controller 190.

While the DC-DC converter 110 is illustrated as a boost (step-up) converter in FIG. 1, it is contemplated that the improved control technique described herein is independent of the topology of the DC-DC converter. That is, the digital control algorithm 194, voltage and current feedback based control techniques may be applied to other known DC-DC converter types such as buck (step-down), buck-boost and Cuk (step-up or step-down with inverse polarity), and charge-pump converters.

Figure 2:
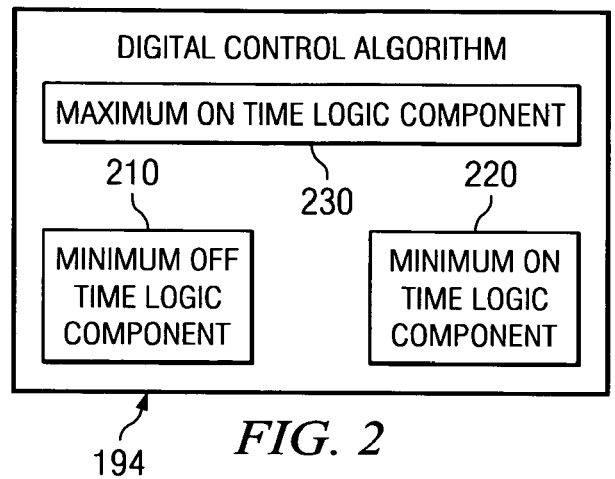
FIG. 2 is a block diagram illustrating details of a digital control algorithm of FIG. 1, according to an embodiment.

FIG. 2 is a block diagram illustrating details of a digital control algorithm of FIG. 1, according to an embodiment. In a particular embodiment, the digital control algorithm 194 includes logic components to control timing aspects of the charge and discharge cycles. The switch 160 is closed (on state) by asserting the control signal 162 when the feedback signal 188 is deasserted (or low). The switch 160 is opened (off state) by deasserting the control signal 162 when the feedback signal 188 is asserted (or high). During the charge cycle, the switch 160 is closed, the inductor current 132 builds up and the output voltage 170 droops. During the discharge cycle, the switch 160 is open, the inductor current 132 decays and the output voltage 170 rises.

In the depicted embodiment, the digital control algorithm 194 includes a minimum off time logic component 210 when the load 120 is heavy, e.g., when the load 120 draws a load current above a threshold. A higher load current draws a higher inductor current build-up for the current feedback signal 184 to overcome a droop in the voltage feedback signal 182 to cause a change of state of the feedback signal 188. Therefore, the switch 160 is closed for longer time duration and thus has a longer $t_{ON}$ on time. When the switch 160 is opened, the minimum off time logic component 210 will over ride the feedback signal 188 and impose a minimum off time to ensure adequate charge transfer takes place every cycle. In addition, the minimum off time digitally filters out any coupling noise. Exemplary waveforms associated with the minimum off time logic component 210 are described with reference to FIG. 4A.

In the depicted embodiment, the digital control algorithm 194 includes a minimum on time logic component 220 when the load 120 is light, e.g., when the load 120 draws a load current below a threshold. A lighter load current causes a lighter inductor current build-up resulting in tripping the feedback signal 188 from low to high during the charge cycle when the switch 160 is closed. However, the minimum on time logic component 220 over rides the feedback signal 188 and imposes a minimum on time to digitally filter out any coupling noise. Due to the light load condition, the feedback signal 188 remains high after the minimum off time imposed by the minimum on time logic component 220 expires. Hence, the switch 160 remains open as long as the feedback signal 188 remains high. Exemplary waveforms associated with the minimum on time logic component 220 are described with reference to FIG. 4B.

In the depicted embodiment, the digital control algorithm 194 includes a maximum on time logic component 230 when the load 120 is heavy, e.g., when the load 120 draws a load current above a threshold and when the voltage input 140 is low, e.g., less than a threshold. Due to the low the voltage input 140, build-up of the inductor current 132 is slow during the charge cycle. To reduce the output voltage 170 from drooping further, the maximum on time logic component 230 imposes a maximum on time that switches the switch 160 to open and thereby charge the capacitor 180 independent of the state of the feedback signal 188. Exemplary waveforms associated with the maximum on time logic component 230 are described with reference to FIG. 4C.

In a particular embodiment, the logic for the minimum on time, minimum off time and maximum on time is performed during every charge/discharge cycle. The particular values for the minimum on time, minimum off time and maximum on time may vary depending on application factors such as the load 120, switching frequency, and variation in input voltage 140. In a particular embodiment, a typical value for the minimum on time is 0.5 microseconds, for the minimum off time it is 1 microsecond, and for the maximum on time it is 6 microseconds. In another embodiment, a maximum duty cycle ($DC_{MAX}$) may be calculated by Equation 200 as follows:

$$DC_{MAX} = (t_{MAX-ON}/(t_{MAX-ON} + t_{MIN-OFF})) \qquad \text{Equation 200}$$

where $t_{MAX-ON}$ is the maximum on time and $t_{MIN-OFF}$ is the minimum off time.

In a particular embodiment, the time period, and hence the switching frequency, for the charge and discharge cycle may vary. That is, the combined time period for consecutive charge and discharge cycles may vary. The minimum on time and the minimum off time constraints imposed by the digital control algorithm 194 may limit a maximum achievable switching frequency of the self-oscillating DC-DC converter 110.

In a particular embodiment, the digital control algorithm 194 may include logic to not limit the maximum off time for the discharge cycle thereby enabling operation of the DC-DC converter in a continuous current mode (CCM) and in a discontinuous control mode (DCM). In addition, a wider range of input voltage 140 and the load 120 may be accommodated by not limiting the maximum off time. In this embodiment, the minimum duty cycle may approach 0 as the maximum off time approaches a large number.

Figure 3:
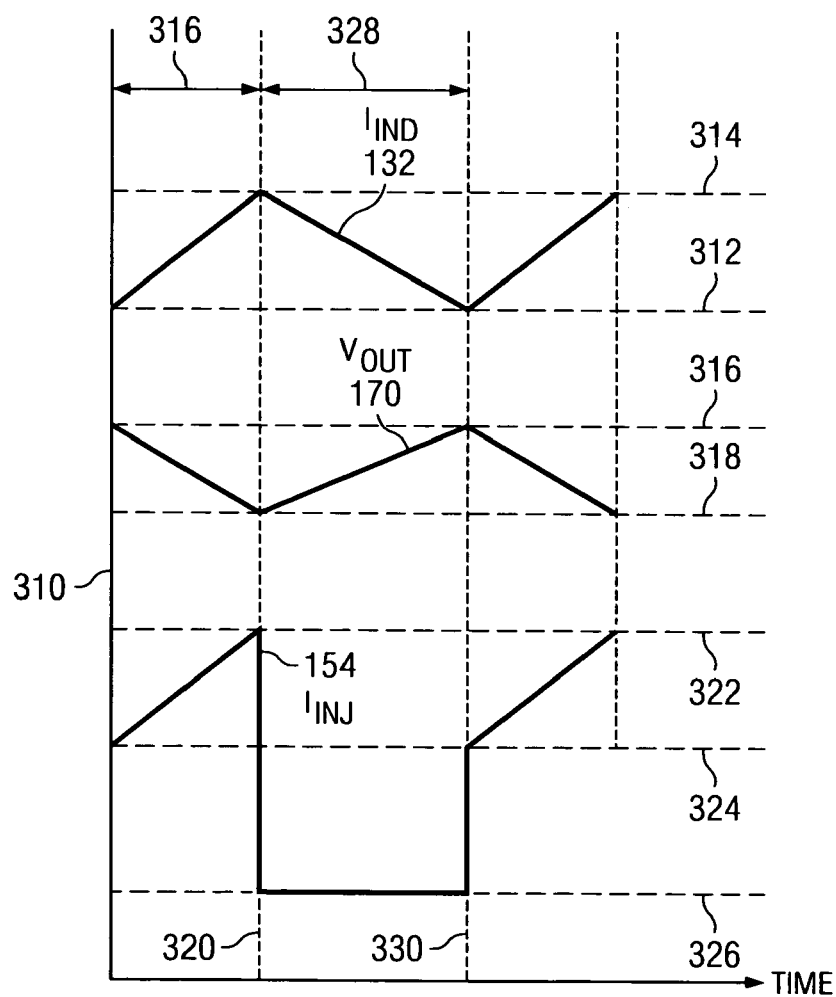
FIG. 3 illustrates waveforms associated with a charge and discharge cycle of DC-DC converter of FIG. 1, according to an embodiment.

FIG. 3 illustrates waveforms associated with a charge and discharge cycle of DC-DC converter 110 of FIG. 1, according to one embodiment. In this illustration, at time $t=t_0$ 310, the switch 160 is closed initiating the charge cycle. The inductor current 132 ($I_{IND}$) increases from an initial value $I_1$ 312 at time $t_0$ 310 to an increased value of $I_2$ 314 at time $t_1$ 320. The diode 150 is reversed biased, and the output voltage $V_{out}$ 170 droops from an initial value $V_1$ 316 at time $t_0$ 310 to a decreased value $V_2$ 318 at time $t_1$ 320. When the sense switch 134 is closed, the injected current $I_{inj}$ 154 jumps from $I_{zero}$ 326 to an initial value $I_3$ 324 at time $t_0$ 310 and ramps up to an increased value of $I_4$ 322 at time $t_1$ 320. The time duration of the charge cycle is the on time period $t_{ON}$ 316. At $t=t_1$ 320, the switch 160 is opened to initiate the discharge cycle. Due to the forward bias on the diode 150, the inductor current 132 drops from the previous value of $I_2$ 314 at time $t_1$ 320 to $I_1$ 312 at $t_2$ 330 to transfer the energy from the inductor 130 to the capacitor 180. The output voltage $V_{out}$ 170 increases from an initial value $V_2$ 318 at time $t_1$ 320 to an increased value $V_1$ 316 at time $t_2$ 330. At $t=t_1$ 320, the sense switch 134 is opened and the injected current $I_{inj}$ 154 drops from the initial value $I_4$ 322 to $I_{zero}$ 326. The time duration of the discharge cycle is the off time $t_{OFF}$ 328. At $t=t_2$ 330, the switch 160 is closed and the charge and discharge cycle repeats.

Figure 4A:
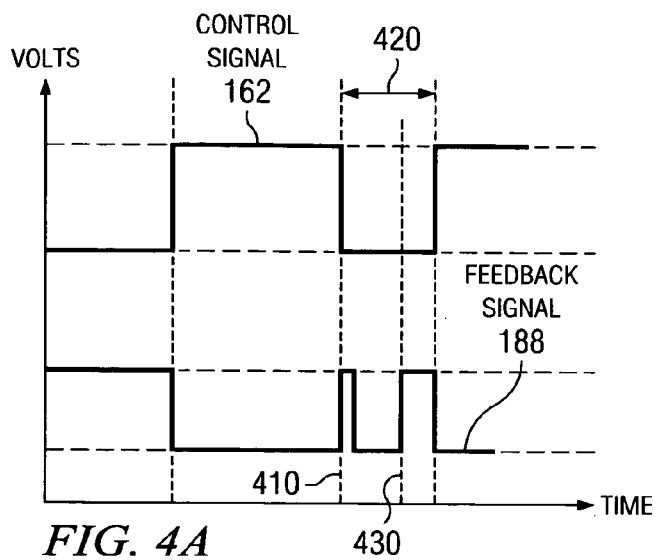
FIG. 4A illustrates waveforms associated with a minimum off time logic component of FIG. 2, according to one embodiment.

FIG. 4A illustrates waveforms associated with a minimum off time logic component 210 of FIG. 2, according to one embodiment. At time $t=t_3$ 410, a spike or glitch occurs in the feedback signal 188 due to noise. The change of state in the feedback signal 188 causes the minimum off time logic to be activated, thereby deasserting the control signal 162 to open the switch 160 for a minimum off time $t_{MIN-OFF}$ 420. At time $t=t_4$ 430, the feedback signal 188 changes state, but this change has no effect on the control signal 162 which keeps the switch 160 open. A traditional DC-DC converter may have discharged momentarily causing poor regulation.

Figure 4B:
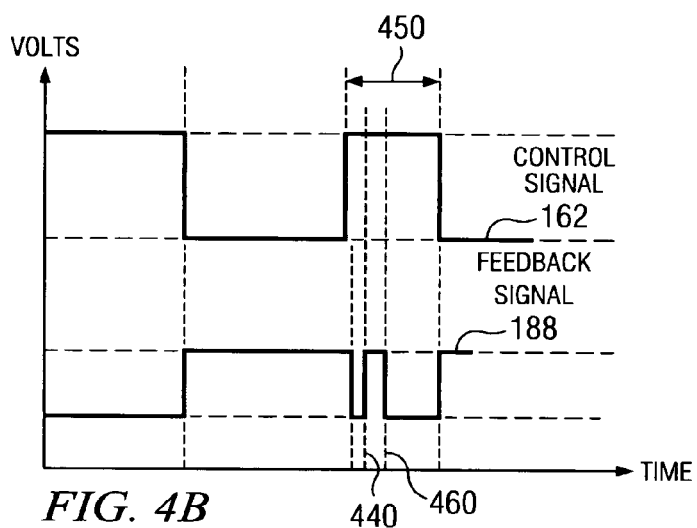
FIG. 4B illustrates waveforms associated with a minimum on time logic component of FIG. 2, according to one embodiment.

FIG. 4B illustrates waveforms associated with a minimum on time logic component 220 of FIG. 2, according to one embodiment. At time $t=t_5$ 440, a spike or glitch occurs in the feedback signal 188 due to noise. The change of state in the feedback signal 188 causes the minimum on time logic to be activated, thereby maintaining the control signal 162 at a high level to keep the switch 160 closed for a minimum on time $t_{MIN-ON}$ 450. At time $t=t_6$ 460, the glitch clears and feedback signal 188 changes state, but this change has no effect on the control signal 162 which keeps the switch 160 closed. A traditional DC-DC converter may have not allowed a sufficient inductor current build up resulting in poor regulation.

Figure 4C:
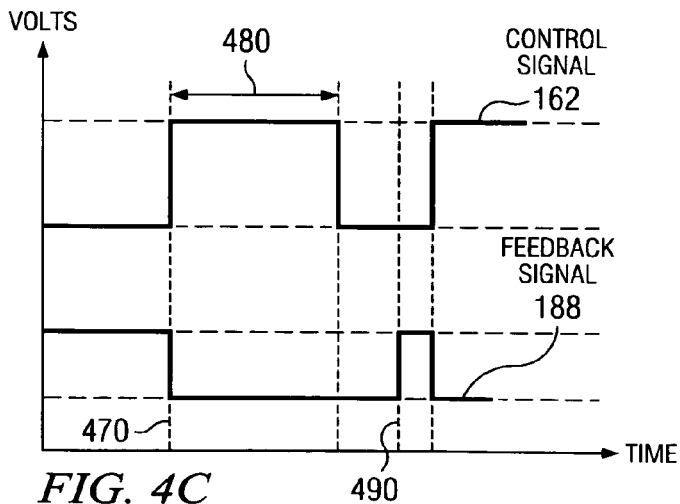
FIG. 4C illustrates waveforms associated with a maximum on time logic component of FIG. 2, according to one embodiment.

FIG. 4C illustrates waveforms associated with a maximum on time logic component 230 of FIG. 2, according to one embodiment. At time $t=t_7$ 470, a change of state in the feedback signal 188 causes the maximum on time logic to be activated, thereby maintaining the control signal 162 at a high level to keep the switch 160 closed for a maximum on time $t_{MAX-ON}$ 480. At time $t=t_8$ 490, a change of state on the feedback signal 188 has no effect on the control signal 162 which keeps the switch 160 open. A traditional DC-DC converter may have not allowed a sufficient discharge resulting in poor regulation.

Figure 5A:
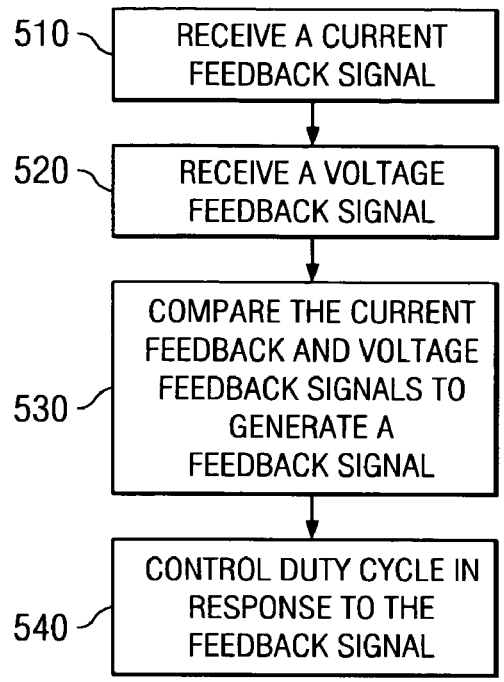
FIG. 5A is a flow chart illustrating a method of controlling a DC-DC converter, according to an embodiment.

FIG. 5A is a flow chart illustrating a method of controlling a DC-DC converter, e.g., the DC-DC converter 110, according to an embodiment. At step 510, a current feedback signal such as the current feedback signal 184 is received. At step 520, a voltage feedback signal such as the voltage feedback signal 182 is received. At step 530, a comparison of the current feedback signal and the voltage feedback signal is made to provide a feedback signal such as the feedback signal 188. At step 540, a duty cycle of the DC-DC converter is controlled by a controller such as the controller 190 responsive to the feedback signal.

Various steps described above may be added, omitted, combined, altered, or performed in different orders. For example, in a particular embodiment, receiving the current feedback signal at step 510 may include performing multiple steps described in FIG. 5B.

Figure 5B:
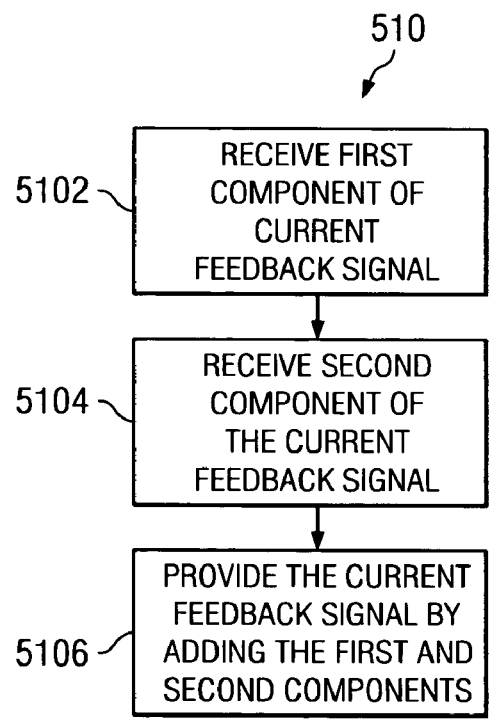
FIG. 5B is a flow chart illustrating a method of receiving a current feedback signal, according to an embodiment.

FIG. 5B is a flow chart illustrating a method of receiving a current feedback signal, according to an embodiment. At step 5102, a first component indicative of the output voltage is received. At step 5104, a second component indicative of the current flowing through the inductor is received. At step 5106, the first component is added to the second component, e.g., as calculated by Equation 110, to provide the current feedback signal.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, while certain aspects of the present disclosure have been described in the context of the system 100 having one or more devices, those of ordinary skill in the art will appreciate that the systems and processes disclosed are capable of being implemented using hardware, software, and firmware components including systems-on-a-chip (SoC) or a combination thereof.

The methods and systems described herein provide for an adaptable implementation. Although certain embodiments have been described using specific examples, it will be apparent to those skilled in the art that the invention is not limited to these few examples. For example, although a boost type DC-DC converter has been described, it is contemplated that additional DC-DC converter types such as buck, buck-boost, Cuk and others may be similarly controlled to improve performance against variations in the load and the input voltage, and for improved susceptibility to noise. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A self-oscillating direct current to direct current (DC-DC) converter comprising:
   an inductor coupled to receive a voltage input at an input terminal;

a switch coupled between the inductor and a reference, wherein the switch receives a control signal for adjusting a duty cycle to control output voltage at an output terminal; and a controller coupled to receive a feedback signal derived as a predefined function of a voltage feedback signal indicative of the output voltage and a current feedback signal indicative of a current flowing through the inductor, wherein the controller provides the control signal in response only to the feedback signal, the controller imposing constraints on the control signal consisting essentially of or more of applying the control signal for a minimum off time when a load coupled between the output terminal and the reference draws a load current above a first threshold, applying the control signal for a minimum on time when a load coupled between the output terminal and the reference draws a load current below a second threshold, applying the control signal for a maximum on time when a load coupled between the output terminal and the reference draws a load current above a current threshold and when the voltage input is below a voltage threshold.

2. The converter of claim 1, wherein the controller asserts the control signal to close the switch when the feedback signal is deasserted and the controller deasserts the control signal to open the switch when the feedback signal is asserted.

3. The converter of claim 1, wherein the current feedback signal is generated by a current feedback circuit coupled between the output terminal and the reference, wherein the current feedback circuit provides the current feedback signal in response to adding a first component indicative of the output voltage to a second component indicative of the current flowing through the inductor.

4. The converter of claim 3, wherein the voltage feedback signal is generated by an integrator, wherein the integrator provides the voltage feedback signal by integrating a second voltage feedback signal and a voltage reference signal and wherein the integrator compensates for a direct current (DC) voltage offset caused by the second component.

5. The converter of claim 4, wherein the second voltage feedback signal is generated by a voltage feedback circuit coupled between the output terminal and the reference, wherein the voltage feedback circuit provides the second voltage feedback signal indicative of the output voltage.

6. The converter of claim 4, wherein the DC voltage offset by an injection current flowing through a sense resistor during an on time of the switch, wherein the injection current is proportional to the current flowing through the inductor.

7. The converter of claim 1, wherein the predefined function is a comparator, wherein the comparator asserts the feedback signal when the current feedback signal is greater than the voltage feedback signal and wherein the comparator deasserts the feedback signal when the current feedback signal is not greater than the voltage feedback signal.

8. The converter of claim 1, wherein the controller switches the switch at a variable switching frequency without receiving a clock signal.

9. The converter of claim 8, wherein the variable switching frequency is limited by a minimum on time and a minimum off time of the switch.

10. The converter of claim 9, wherein the minimum on time and the minimum off time of the switch filter out a noise component of the feedback signal.

11. The converter of claim 1, wherein a diode is coupled in series between the inductor and the output terminal, wherein a load is coupled between the output terminal and the reference, wherein the load is an integrated circuit chip.

12. A method of controlling a self-oscillating direct current to direct current (DC-DC) converter, the method comprising:
receiving a current feedback signal indicative of a current flowing through an inductor of the DC-DC converter;
receiving a voltage feedback signal indicative of an output voltage of the DC-DC converter;
comparing the current feedback signal and the voltage feedback signal to provide a feedback signal; and
generating a control signal to control a duty cycle of the DC-DC converter responsive only to the feedback signal, wherein the duty cycle regulates the output voltage, the controller imposing constraints on the control signal consisting essentially of applying the control signal for a minimum off time when a load coupled to the output voltage draws a current above a first threshold, applying the control signal for a minimum on time when the load draws the load current below a second threshold, applying the control signal for a maximum on time when the load draws the laooad current above a current threshold and when an input voltage is below a voltage threshold.

13. In the method of claim 12, wherein the output voltage is provided to a load coupled to the DC-DC converter, wherein the load is an integrated circuit chip.

14. In the method of claim 12, wherein the DC-DC converter is one of a boost converter, a buck converter, a buck-boost converter, and a Cuk converter or a combination thereof.

15. An electronic system comprising:
a load coupled to an output terminal; and
a self-oscillating direct current to direct current (DC-DC) converter operable to provide power to the load, the converter including:
an inductor coupled to receive a voltage input at an input terminal;
a switch coupled in series between the inductor and a reference, wherein the switch receives a control signal for adjusting a duty cycle to control an output voltage at the output terminal; and
a controller coupled to receive a feedback signal derived only as a predefined function of a voltage feedback signal indicative of the output voltage and a current feedback signal indicative of a current flowing through the inductor, wherein the controller provides the control signal in response to the feedback signal, the controller imposing constraints on the control signal consisting essentially of applying the control signal for a minimum off time when the load draws a load current above a first threshold, applying the control signal for a minimum on time when the load draws the load current below a second threshold, applying the control signal for a maximum on time when the load draws the load current above a current threshold and when the voltage input is below a voltage threshold.

16. The system of claim 15, wherein the load is a digital signal processor (DSP).

17. The system of claim 15, wherein the DC-DC converter is one of a boost converter, a buck converter, a buck-boost converter, and a Cuk converter or a combination thereof.

* * * * *